United States Patent
Eatedali et al.

(10) Patent No.: US 10,786,739 B2
(45) Date of Patent: Sep. 29, 2020

(54) DYNAMIC ADJUSTMENT OF AVAILABILITY OF ACCESS TO VIDEO GAMES BASED ON REAL-WORLD EVENTS

(71) Applicants: Josiah Eatedali, Los Angeles, CA (US); Jon Ray Estanislao, South Pasadena, CA (US); Brandon Myles Zien, Sherman Oaks, CA (US)

(72) Inventors: Josiah Eatedali, Los Angeles, CA (US); Jon Ray Estanislao, South Pasadena, CA (US); Brandon Myles Zien, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/164,559

(22) Filed: Oct. 18, 2018

(65) Prior Publication Data
US 2020/0001185 A1    Jan. 2, 2020

Related U.S. Application Data

(63) Continuation-in-part of application No. 16/020,833, filed on Jun. 27, 2018, now Pat. No. 10,650,124.

(51) Int. Cl.
| | | |
|---|---|---|
| *A63F 13/00* | (2014.01) | |
| *A63F 13/73* | (2014.01) | |
| *A63F 13/65* | (2014.01) | |
| *G06F 21/12* | (2013.01) | |

(52) U.S. Cl.
CPC .............. *A63F 13/73* (2014.09); *A63F 13/65* (2014.09); *G06F 21/121* (2013.01)

(58) Field of Classification Search
None
See application file for complete search history.

(56) References Cited

U.S. PATENT DOCUMENTS

| | | | | |
|---|---|---|---|---|
| 2005/0138082 A1* | 6/2005 | Rauma | ................ | H04L 67/1095 |
| 2010/0293536 A1* | 11/2010 | Nikitin | .................. | G06F 21/105 |
| | | | | 717/168 |
| 2012/0011069 A1* | 1/2012 | Kazawa | .................. | G06F 21/10 |
| | | | | 705/59 |
| 2012/0136998 A1* | 5/2012 | Hough | .................... | G06F 21/10 |
| | | | | 709/225 |
| 2012/0255025 A1* | 10/2012 | Roshchin | .............. | G06F 21/105 |
| | | | | 726/26 |
| 2012/0278439 A1* | 11/2012 | Ahiska | ................ | H04L 67/2852 |
| | | | | 709/218 |
| 2016/0012211 A1* | 1/2016 | Scapa | .................... | G06F 21/10 |
| | | | | 726/28 |

* cited by examiner

*Primary Examiner* — Paul A D'Agostino
(74) *Attorney, Agent, or Firm* — Klein, O'Neill & Singh, LLP

(57) ABSTRACT

A number of licenses for play of a video game may be modified or adjusted based on real-world events. Game areas for play of the video game may also change based on real-world events.

19 Claims, 9 Drawing Sheets

US 10,786,739 B2

DYNAMIC ADJUSTMENT OF AVAILABILITY OF ACCESS TO VIDEO GAMES BASED ON REAL-WORLD EVENTS

CROSS REFERENCE TO RELATED APPLICATION

This application is a continuation-in-part (CIP) of U.S. patent application Ser. No. 16/020,833, filed on Jun. 27, 2018, the disclosure of which is incorporated by reference herein.

BACKGROUND OF THE INVENTION

The present invention relates generally to video games, and more particularly to the dynamic adjustment of availability of access to video games based on real-world events.

Video games provide a source of entertainment for many. Video games often provide an interactive activity that can be interesting and challenging, and may allow game players to control game characters engaged in various simulated activities, including real-life activities that may otherwise be unavailable to the game player. Moreover, the game characters may utilize personal equipment not readily available in the real world to game players, allowing the game players simulated use of a variety of real world items.

Video games simulation of real world activities may be of a limited nature in a variety ways, however. Video games may not fully simulate the physicality, or lack thereof, of for example the look and feel of controllers used for simulating equipment. Video games also may not fully simulate general constructs that individuals may face when desiring to participate in an activity. For example, many real-world activities may have limits on the number of participants. Various venues and locales for example may only be able to accommodate a fixed maximum number of people at a time, regardless of how many people may wish to and are otherwise able to enjoy doing so.

BRIEF SUMMARY OF THE INVENTION

Various embodiments may provide a method of modifying a number of licenses available for play of a video game, comprising: receiving, by a game server, information regarding real-world events; monitoring the information regarding real-world events for a predetermined real-world event; determining that a license event has occurred in response to the information regarding real-world events indicating that the predetermined real-world event has occurred; in response to determining that the license event has occurred, modifying a number of licenses for play of the video game.

Some embodiments may provide a method of modifying a number of a licenses for licensed play of a video game, comprising: determining that a game area modification event has occurred based on a real-world condition meeting a specified condition; and making a modification to game areas available for play in response to determining that the game area modification event has occurred.

These and other aspects of embodiments of the invention are more fully comprehended upon review of this disclosure.

DETAILED DESCRIPTION

Figure 1:
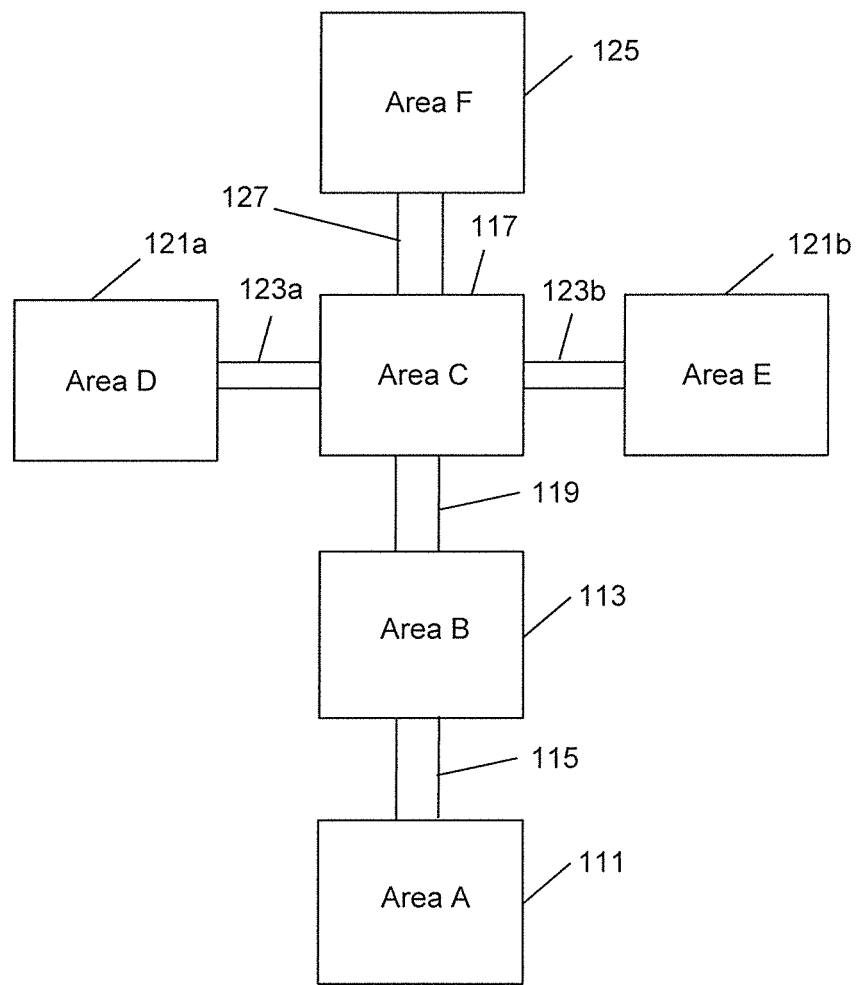
FIG. 1 is a map of game areas of a video game, in accordance with aspects of the invention.

FIG. 1 is a map of game areas of a virtual game world for a video game, in accordance with aspects of the invention. The map is used for illustrative purposes, namely as a basis for discussion of how in-game activities or results may affect a number of available game licenses. In the case of the map of FIG. 1, the map shows a plurality of virtual areas available for play in the video game. In some embodiments the number of available game licenses at a given time may be based on or linked to the number of areas available for play at the given time. For example, as a number of available areas of play increases, in some embodiments based on activities of game characters in the video game or in some embodiments based on real-world events, so too may a number of available game licenses increase. Similarly, in some embodiments characteristics of newly available areas, or in some embodiments existing areas, may be based on, reflect condition of, or depend on real-world events.

The map of FIG. 1 includes six game areas in which play of the video game may occur. The game areas may virtually simulate the same or different landscapes, terrains, urban or rural areas, complexes or any of a variety of different locales or types of locales. The game areas of FIG. 1 include an Area A 111, an Area B 113, and Area C 115, an Area D 121*a*, an Area E 121*b*, and an Area F 125. Area A, for example, may include features similar to a town, Area B may be a more rural area, Area C may be in the form of a downtown cityscape of a large city, Area D may include buildings representative of an industrial manufacturing area, and Areas E and F may both be areas reminiscent of suburban locales. In various embodiments some or all of the areas may be fantastical areas, or areas representative of a single large structure or representative of a neighborhood or a particular landscape or seascape. In some embodiments some or all of the areas may be representative of areas which may be separate from or outside of a space-time fabric of others of the areas, and which in some embodiments my therefore be considered to be non-physical, with such areas for example an alternate dimension or past or present temporal realms. In some embodiments one or more of the areas may contain different types or combinations of areas. In some embodiments an area may reflect a real-time event, which may be a real-world condition, such as weather of a particular locale, or aspects of an area may relate to a particular geographical area based on a real-time event with a relation to that geographical area.

In some embodiments, movement of game characters between areas is accomplished through passages. In FIG. 1, a first passage 115 connects Area A and Area B. Similarly, a second passage 119 connects Area B and Area C. Area C, in turn, is connected to Area D and Area E by a third passage 123a and a fourth passage 123b, respectively. Area C is also connected to Area F by a fifth passage 127. Accordingly, in the embodiment of FIG. 1, four areas, Areas A, D, E, and F, are each connected to only one other area, while Area B is connected to two areas, and Area C is connected to four areas. Further, although the passages are shown as occupying appreciable discrete lengths in FIG. 1, in various embodiments, however, some or all of the passages may be in the form of gates, or even simple dividing lines between abutting areas. In addition, in some embodiments an area or some areas may be completely enclosed within other areas.

In some embodiments the number of areas available for play of the video game may change based on in-game activities or results. The in-game activities or results may be activities or results of activities of game characters in the video game, in some embodiments, and may be in-game activities or results which comprise game scenario changes which affect some or all of the game characters in the video game. For example, in the context of FIG. 1, in some embodiments initially only some of the areas may be available for play of the video game, with additional areas becoming available for play at later times. In such embodiments, initially only a first number of licenses for play of the video game may be available, with additional licenses becoming available as additional areas become available for play. Similarly, in some embodiments the number of areas available for play of the video game may change based on real-world events. In some embodiments the real-world events may include an occurrence of an event or condition independent of any aspect of play of the video game, or of play of any video game in some embodiments. In some embodiments the real-world events may be related in some way to play of the video game, but independent of in-game activities of game characters or results achieved by the game characters. For example, in some embodiments the real-world event may be a predefined number of views or viewers of a stream from a particular streamer of the video game, or play of a predefined amount of time of the video game by players in a particular geographical or virtual community.

For example, in one embodiment only Area A is initially available for play, and only a first predetermined number of licenses for play of the video game are available. The number of game players that may play the game is therefore limited to the first predetermined number, and the game characters controlled by those game players are limited to play in Area A. At a later time, Area B additionally may become available for play of the video game, and a number of licenses for play of the video game may be increased. In some embodiments Area B may become available for play, and the number of licenses increased, based on activities of the game characters in video game play. For example, the game characters, or one or some of them, may perform actions that result in unlocking of a gate, or defeating a video game controlled game character of group of game characters, or at least one game player or team of game players achieving a predetermined score or level, or some other result, such that Area B becomes available for play. In some embodiments Area B may become available for play based on real-world events. For example, in some embodiments Area B may become available for play once a temperature of a specified locale reaches a particular value.

In some embodiments, instead of or in addition to new areas in becoming available for play in an existing video game world, new instances of the video game may become available for play. For example, if players perform certain predefined actions in a first game world, a second instance of the same or different video game world may be created such that new players may join the second instance of the video game world and play in the second instance of the video game world independently of the first video game world. In other embodiments new areas and/or licenses may become available in a different video game altogether.

Similarly, further actions by game characters or real-world events may result in Area C becoming available for play, along with further licenses for play of the video game becoming available. In some embodiments, still further serially performed actions by game characters or real-world events may result in Areas D, E, and F serially becoming available for play, along with concomitant additional licenses also becoming available. In some embodiments, however, the further actions by game characters or real-world events that result in Area C becoming available for play may also result in some areas connected to Area C, for example Areas D and E, also becoming available for play, along with the further licenses associated with those areas becoming available.

In some embodiments all of the areas may be available for play at the outset, with further licenses for play of the video game becoming available based on actions by game characters, or in some embodiments game scenario changes which affect some or all of the game characters in the video game, or in some embodiments real-world events. The availability of further licenses, therefore, in some embodiments may be based on in-game activities or results, or real-world events, without an accompanying change to an aspect of the areas available for play of the video game. In various embodiments, for example embodiments in which additional areas become available for play, the availability of further licenses is accompanied by a change to an aspect of the virtual world of play of the video game, for example the areas available for play. In other embodiments, the availability of further licenses is accompanied by other changes to aspects of the virtual world of play of the video game, for example the virtual items, non-player characters, challenges, objectives, and missions available in the virtual world.

In some embodiments some or all of the newly available licenses for play of the game are distributed or distributable by at least some game players who had licenses immediately prior to an event giving rise to the newly available licenses. In some embodiments the at least some game players comprise all game players who had licenses immediately prior to an event giving rise to the newly available licenses. In some embodiments the at least some game players comprise, and in some embodiments consist of, those game players who achieved particular results during game play related to the event giving rise to the newly available licenses. In some embodiments remuneration, based on distribution of the newly available licenses, is provided to at least some game players who had licenses immediately prior to an event giving rise to the newly available licenses. In some embodiments some or all of the newly available licenses for play of the game are distributed or distributable by persons that were responsible for the event giving rise to the newly available licenses or who have a predefined relationship to the event, and the video game in some embodiments. For example, if the event is ambient air temperature rising above a predetermined temperature of a specific locale, in some embodiments the newly available license may be distributed or distributable by game players indicated as residing in or near that locale.

Figure 2:
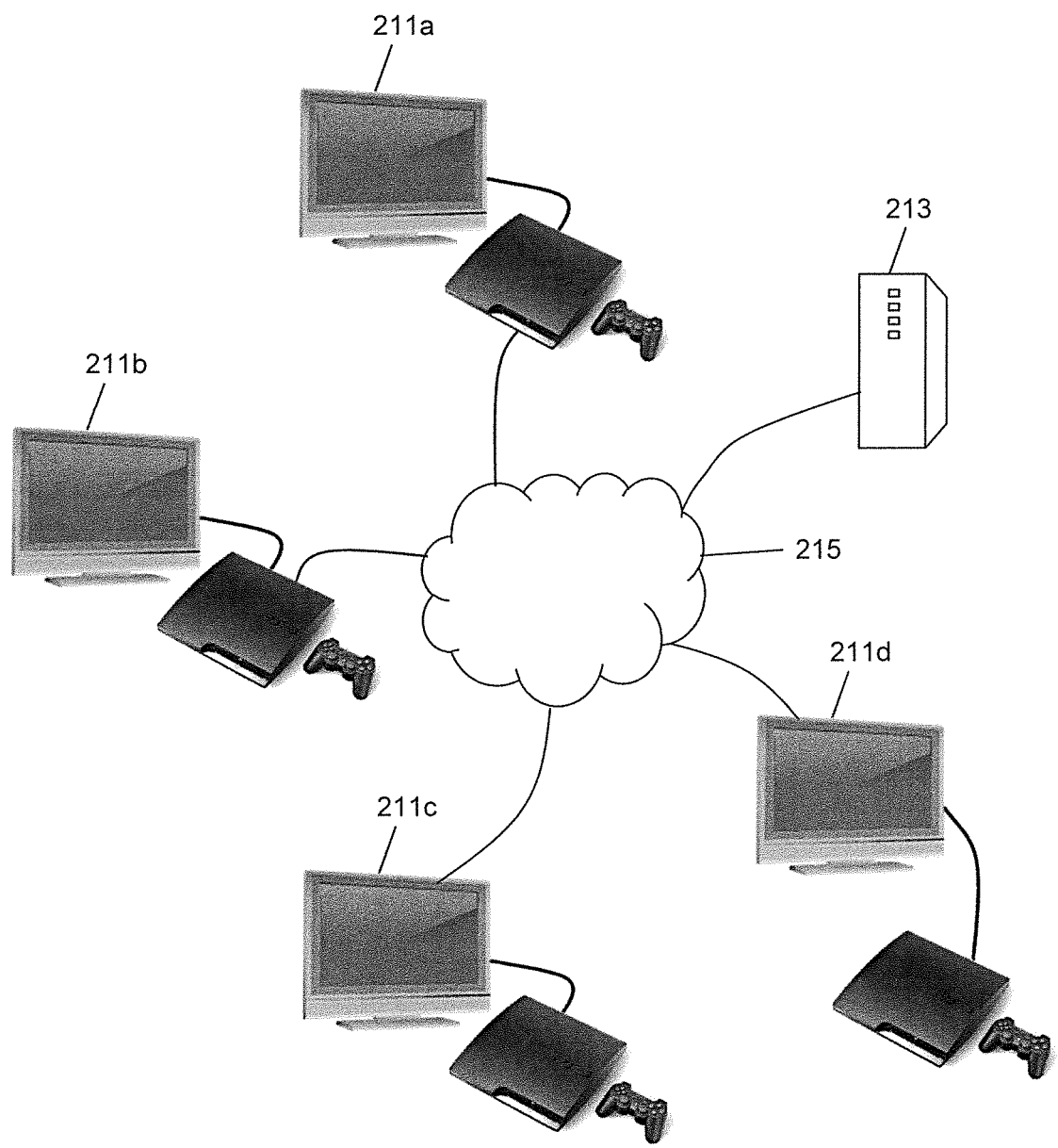
FIG. 2 is a semi-block diagram of a system in accordance with aspects of the invention.

FIG. 2 is a semi-block diagram of a system in accordance with aspects of the invention. The system includes a plurality of game devices 211a-d coupled to each other and a game server 213 over a network 215, which may be for example the Internet.

The game devices are shown as including a game console, a game controller, and a display. In various embodiments the game devices may instead or in addition comprise a personal computer, a tablet computer, a smart phone, and/or some other compute device, each configured for video game play. In addition, for purposes of illustration, only a small number of game devices are shown in FIG. 2, in most embodiments the number of game devices may be over a thousand, and may be an order of magnitude or orders of magnitude greater than that.

The game devices are configured, or configurable, for play of a video game, for example a multi-player video game. In some instances initially only one player may be able to play the video game, for example until additional licenses are made available. Accordingly, for purposes of this disclosure a multi-player video game may in some circumstances only have a total of one license for a single player to play the game or otherwise be accessible and playable by only one player until certain conditions are met, for example as discussed herein. During play of the video game, a game player utilizes the game controller or other input devices of a game device to control actions of a game character associated with the game player. During game play, the game character, responsive to commands provided by the game controller, is in and interacts with a virtual world and its other inhabitants, some of whom may be game characters controlled by other game players and some of whom may be game characters controlled by the video game itself.

In multi-player video games, the game server receives information regarding game play status from the game devices, with the game server distributing the game play status to the various game devices. In some embodiments the game server may instead receive requests for game character actions from the game devices, with the game server determining game play status and distributing information regarding game play status to the game devices. The game server is shown in FIG. 2 as a stand-alone server. In various embodiments, however, functions of the game server may instead be performed by a game device.

Part of the game devices being configured for play of the video game includes possession of a license to play the video game. In some embodiments the game server may provide the licenses to game devices. Provision of the licenses may depend on licenses being available, with a number of licenses available being dependent on in-game activities or results. In various embodiments other servers or devices may instead issue licenses for play of the video game, with the other servers or devices in communication with the game server, for example so as to receive notification of a license event, based on in-game activities or results, indicating a modification to a number of available game licenses. In some such embodiments the other servers or devices, which may be considered license servers, may also receiving information relating to the in-game activities or results pertaining to the license event.

As an example, in one example embodiment initially game devices 211a,b,c may be configured for play of a video game, including having a license to play the video game, while game device 211d is not so configured. Moreover, for the purpose of this example embodiment, no license may be available, at least initially, for game device 211d. During play of the video game, by game players using game devices 211a,b,c, the game characters of those game players may achieve a particular result, for example a victory over a set of non-player characters, that increases a number of available licenses, or a real-world event may occur that increases the number of available licenses. In some such embodiments, the game server (or license server, depending on the embodiment) may allow distribution of an additional license for play of the video game. The distribution may be by way of sale of the additional license, for example to a game player utilizing the game device 211d. In some embodiments one or more of the game players associated with game devices 211a,b,c may receive remuneration from the sale of the license, for example based on the exploits of their game characters in achieving the particular result that increased the number of available licenses. In some embodiments one or more game players, or some other person, may receive remuneration from the sale of the license based on their relationship to the real-world event. The remuneration may take various forms, and may for example be in the form of virtual currency, in-game items, real-world monetary remuneration, or various other items or objects.

Figure 3:
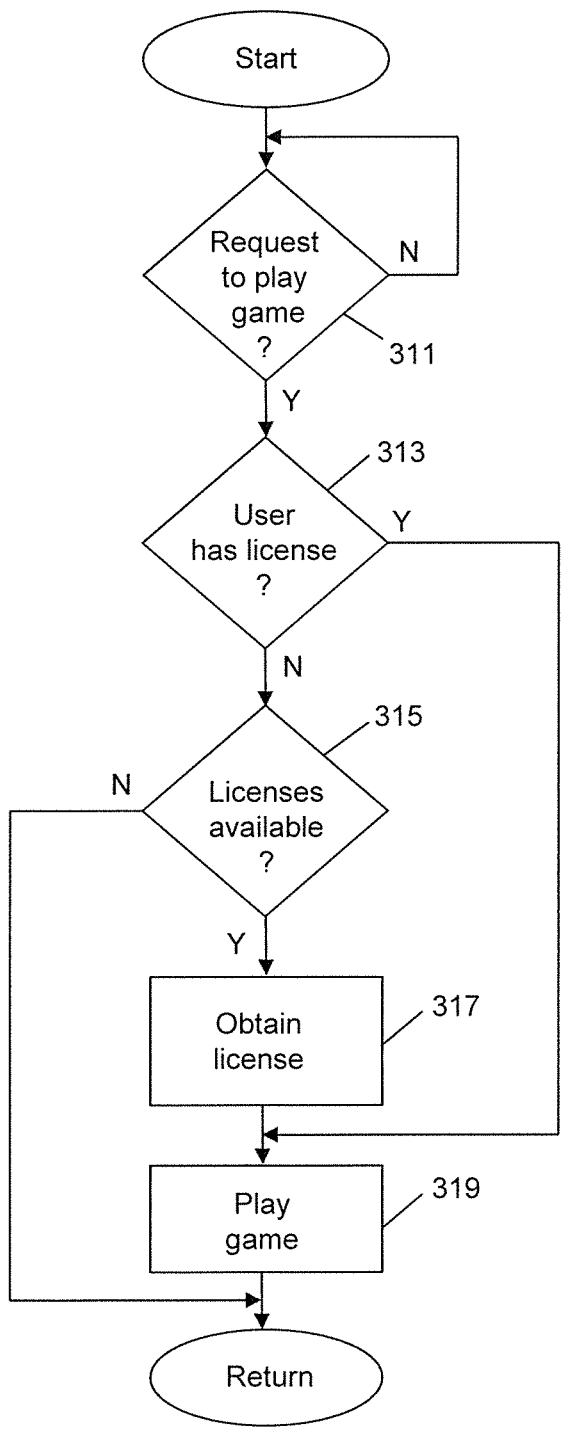
FIG. 3 is a flowchart of a process in accordance with aspects of the invention.

FIG. 3 is a flowchart of a process in accordance with aspects of the invention. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by one or more game devices, for example the game devices of FIG. 2. In some embodiments part of the process is performed by a license server.

In block 311 the process determines if there has been a request to play a video game. In some embodiments the request is made by a game device. The request may be received, for example, by a game server, or in some embodiments a game device.

If there has been a request, in response in block 313 the process determines if a user associated with the request has a license to play the game. The license, for example, may be in the form of a numeric or alphanumeric or other code, which may be verified, for example by a game server. If the user has a license to play the game, the process proceeds to block 319 and play of the video game by the user using a game device commences (or recommences). In some embodiments information about the licenses and/or game state may be recorded in a blockchain or other similar cryptographically secured public ledger.

If the user does not have a license, the process determines in block 315 whether a license is available to distribute to the user. In some embodiments a number of licenses available for play of the video game may be limited, with the number of licenses available changing over time based on in-game activities and/or results of video game play by those who already have licenses and/or elapsed time. If no licenses are available, the process returns. If licenses area available, however, the process continues to block 317.

In block 317 the user obtains a license. In some embodiments the user obtains the license by participating in a commercial transaction in which the user provide payment in return for the license. In some embodiments the user receives video game software, for example downloaded from a server, along with the license (which may be embedded in the video game software).

In block 319 the user plays the video game. In some embodiments play of the video game is accomplished with the user providing user inputs to a game device, for example by way of a game controller or other user input device, to control a game character in and interacting with a virtual world. In many embodiments the video game is a multi-player video game, and the game device provides information to a game server as to status of the game and game character, with the game device also receiving from the game server status of the game and other game characters controlled by other game players.

In various embodiments activities of the game character and/or the other game characters controlled by other game players, and/or results of those activities, result in a change in a number of licenses available for play of the video game. In such embodiments, the game server may monitor status of game play for such events, which may be considered license events. The game server may change the number of available licenses for play of the video game in response to an occurrence of a license event. In some embodiments the game server may make additional licenses available in the event of a license event. In some embodiments the game server may notify a license server of the occurrence of the license event, along with an indication of the nature of the license event in some embodiments. In such embodiments the license server may change the number of available licenses for play of the video game.

The process afterwards returns.

Figure 4:
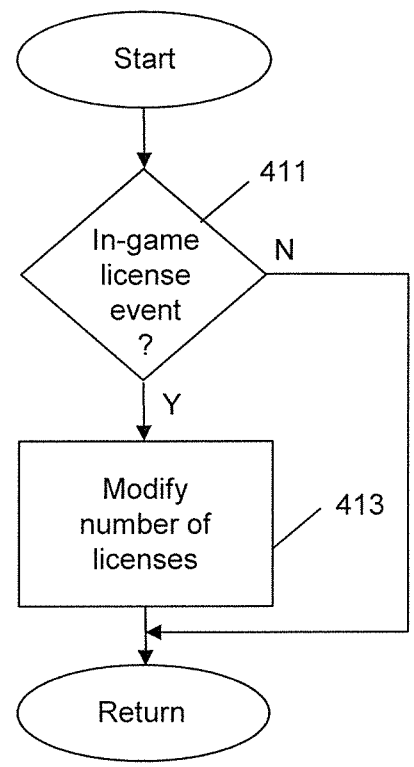
FIG. 4 is a flowchart of a process for modifying a number of licenses for a video game, in accordance with aspects of the invention.

FIG. 4 is a flowchart of a process for modifying a number of licenses for a video game, in accordance with aspects of the invention. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by a license server.

In block 411 the process determines if an in-game license event has occurred. In some embodiments the game server determines if the in-game license event has occurred. In some embodiments the game server notifies a license server if the in-game license event has occurred. In some embodiments the in-game license event is an occurrence of a predetermined event during game play. In some embodiments the predetermined event is an event that results in additional game areas in a virtual world being available for play. In some embodiments the predetermined event is attainment of a predetermined game level by a game player, or a predetermined number of game players, or a predetermined ratio of game players to total game players, or some other criteria. In some embodiments the predetermined event is a particular outcome or result of a challenge or battle involving one or more game players. In some embodiments the predetermined event is one or more particular victories by game players. In some embodiments the sale of a certain number of licenses triggers the existence or commencement of an in-game license event. For example, an in-game license event may commence when a threshold number of licenses (e.g., 100 licenses, half of all licenses, all licenses, etc.) have been sold.

If no in-game license event has occurred, the process returns. Otherwise the process continues to block 413.

In block 413 the process modifies a number of licenses available for play of the video game in response to the occurrence of the in-game license event. In some embodiments the game server modifies the number of licenses. In some embodiments the license server modifies the number of licenses. In some embodiments the number of licenses is modified by a predetermined amount. In some embodiments the number of licenses is modified based on a number of previous number of licenses available for play of the video game immediately prior to the occurrence of the in-game event. In some embodiments the number of licenses is modified based on a type of event for the in-game license event. In some embodiments the number of licenses is modified in accordance with an equation of the form $y=mx+b$, where y equals a number of licenses available after occurrence of the license event, x equals a number of licenses available prior to occurrence of the license event, m is a real number, and b is an integer. In some such embodiments rounding or truncation may be performed such that y is an integer. In some embodiments some other equation may be used to determine y. As examples, in some embodiments m may be equal to 1 and b may be equal to 1000, in some embodiments m may be equal to 1 and b may be equal to −1000, in some embodiments m may be equal to 1.1 and b may be equal to 0, in some embodiments m may be equal to 0.9 and b may be equal to 0, in some embodiments m may be equal to 0.95 and b may be equal to 10,000, and in some embodiments m may be equal to 1.17 and b may be equal to 1237, and in some embodiments m may be equal to 1.1 and b may be equal to −25,000. In some embodiments, changes in numbers of licenses may be allocated based on various activities of game players (e.g., extent of game play by game players in a predetermined amount of time, extent of game play participation by game players in certain in-game license events, results of contests engaged in by game players, or effects of in-game events.)

The process thereafter returns.

Figure 5:
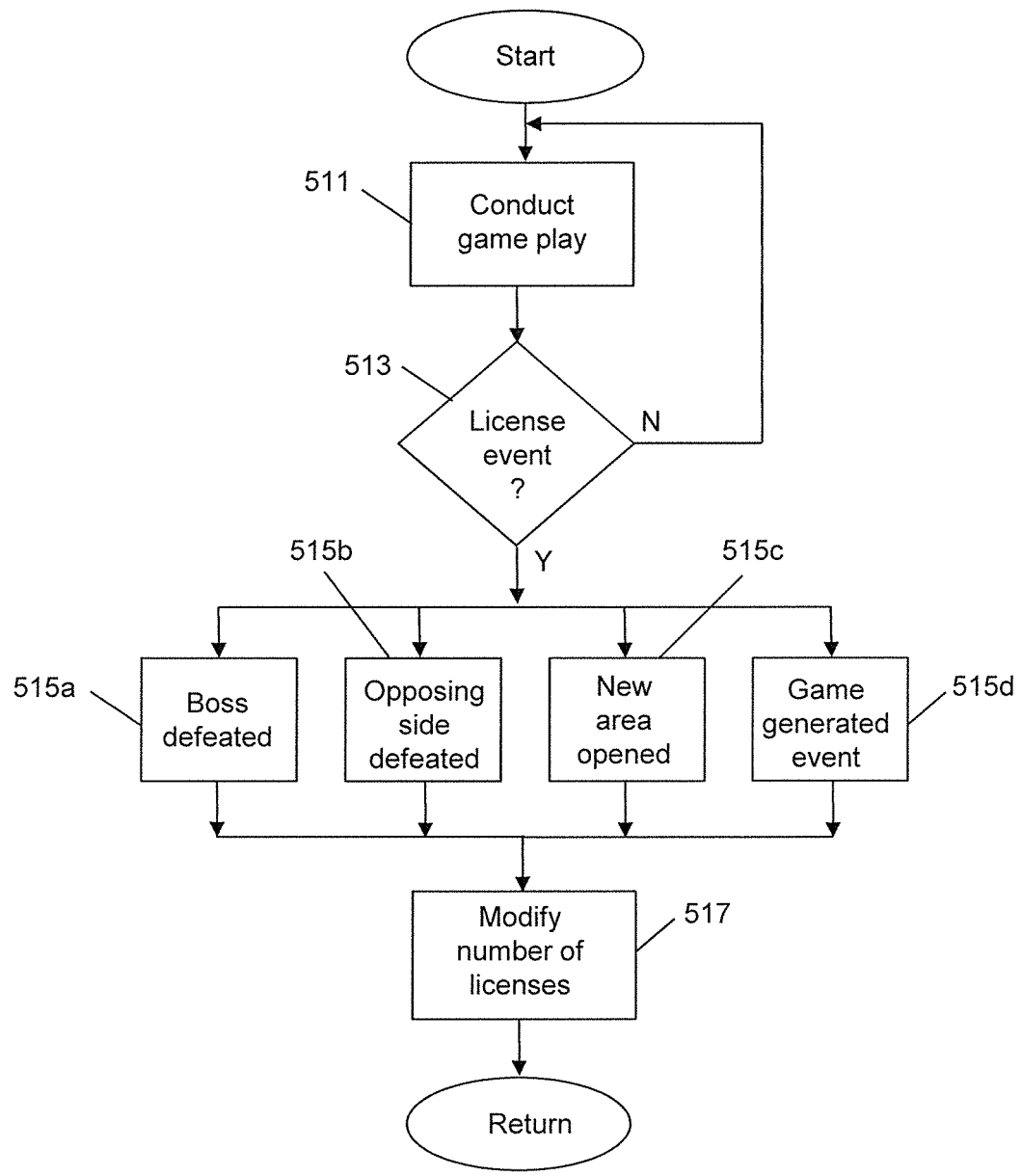
FIG. 5 is a further flowchart of a process for modifying a number of licenses for a video game, in accordance with aspects of the invention.

FIG. 5 is a further flowchart of a process for modifying a number of licenses for a video game, in accordance with aspects of the invention. In some embodiments the process is performed by one or more processors, for example configured by program instructions. In some embodiments part of the process is performed by a game server, for example the game server of FIG. 2. In some embodiments part of the process is performed by one or more game devices, for example the game devices of FIG. 2. In some embodiments part of the process is performed by a license server.

In block 511 the process conducts game play of a video game. During game play, game players may control game characters using user input devices of game devices, with the game devices reporting game status information to a game server. The game server may distribute the game status information amongst the game devices, allowing for multi-player play of the video game.

In block 513 the process determines if a license event has occurred. In some embodiments a license event may be any of a boss defeated event, an opposing side defeated event, a new area opened event, or a game generated event. FIG. 5 assumes the license event is one of the foregoing events, for illustrative purposes. In various embodiments, however, some or all of those events may not be license events, and other events may instead or in addition be license events, and in some embodiments some of the events separately specified may be combined into a single event. If no license event has occurred, the process returns to operations of block 511.

If a license event has occurred, the process continues to one of blocks 515a-d, depending on a type of license event that has occurred. If the license event is a boss defeated license event, the process continues to block 515a. A boss defeated license event may be, for example, an event wherein a particularly dangerous or skilled video game controlled game character is defeated by game character(s) controlled by game players. If the license event is an opposing side defeated license event, the process continues to block 515b. An opposing side defeated license event may be, for example, an event wherein a first team of game characters defeats a second team of game characters under rules of a contest of the video game. The first team of game characters will generally be at least partially controlled by game players, and the second team of game characters may be controlled by the video game, for example. If the license event is a new area opened license event, the process continues to block 515c. A new area opened license event may be when a new area of a virtual world of video game play becomes available for entry, or opened, by game characters controlled by game players. In various embodiments a new area may be opened as a result of game characters controlled by game players achieving a predetermined result, or in some embodiments based on some other criteria implemented by the video game. If the license event is a game generated license event, the process continues to block 515d. A game generated license event may be when an event generated by the video game, for example at a predetermined time, a time based on a random or pseudo-random number, or upon the occurrence of some other predetermined criteria. The license event may also be time and date based, for example a license event may be defined as a particular date and time and/or span a specific time period.

In some embodiments a hierarchy of license events may be established to determine processing for a license event, for example in the event two or more license events occur based on a same in-game event. For example, in the foregoing, a boss defeated license event may also be an event that results in newly opened areas, in some embodiments. In such a case, the process may, based on a predetermined hierarchy, determine that a boss defeated license event may supersede a newly opened area license event, with the process performing processing for the boss defeated license event instead of the newly opened area license event. In other embodiments, however, processing for both license events may be performed.

In some embodiments in blocks 515a-d the process determines a change in a number of licenses available for play of the video game, with the change in the number being dependent on the type of license event. In some embodiments the process in addition determines applicability of credit to various game players for the occurrence of the license event, for at least some of the license events. In some embodiments a game server transmits an indication of the license event to a license server, and the license server determines the change in the number of licenses. In some embodiments an indication of game players responsible for or extent of particular game players responsibility for the defeat of the boss is determined, and in some embodiments transmitted to the license server. In some embodiments an indication of importance of the license event for a number of available licenses to play the video game is determined, and in some embodiments transmitted to the license server.

In block 517 the process modifies the number of licenses for play of the video game. In some embodiments the process modifies the number of licenses available based on a predetermined number and the license event, or a type of the license event. In some embodiments the process modifies the number of licenses available based on an existing number of licenses for the video game, prior to the license event, and the license event. In some embodiments the process utilizes a mathematical formula in modifying the number of licenses.

The process thereafter returns.

Figure 6:
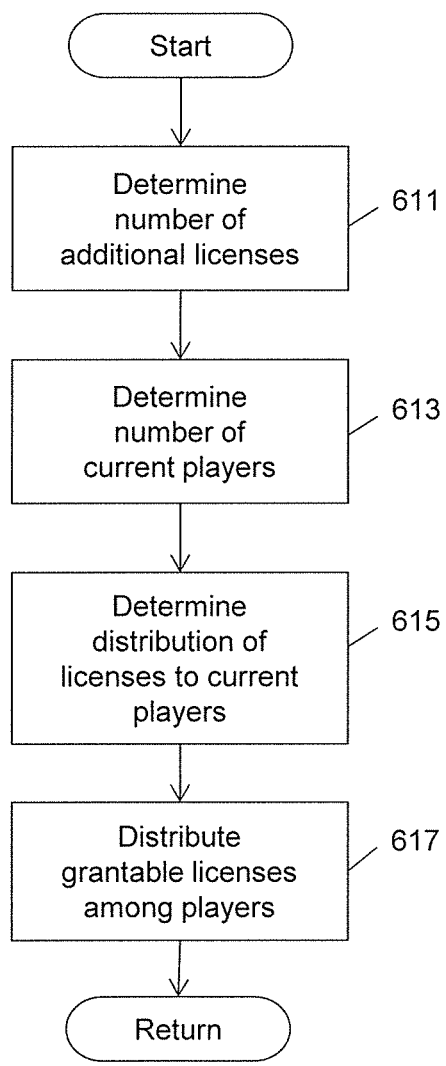
FIG. 6 is a flowchart of a process for determining distribution of licenses, in accordance with aspects of the invention.

FIG. 6 is a flowchart of a process for determining distribution of licenses, in accordance with aspects of the invention. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by a license server.

In block 611 the process determines a number of additional licenses for play of a video game. In some embodiments the process determines the number of additional licenses based on a license event. In some embodiments the process determines the number of additional licenses based on a predetermined criteria. In some embodiments the process determines a number of additional licenses as discussed with respect to block 413 of the process of FIG. 4 or block 517 of the process of FIG. 5, or block 815 of the process of FIG. 8. In some embodiments the process determines the number of additional licenses based on a number of already existing licenses.

In block 613 the process determines a number of current game players of the video game. In some embodiments the current game players are those game players with a license to play the video game.

In block 615 the process determines a distribution of the additional licenses amongst the current game players. In some embodiments the process instead determines a distribution of credit for the additional licenses amongst the current game players. In some embodiments the distribution of additional licenses, or credit for the additional licenses, is an even distribution amongst the current players. In some embodiments the distribution of additional licenses, or credit for the additional licenses, is a distribution that varies based on an extent of responsibility each game player is credited for occurrence of an in-game license event. In some embodiments the distribution of additional licenses, or credit for the additional licenses, is a distribution that varies based on a number of points or a number of levels a game player has attained. In some embodiments the distribution of licenses, or credit for the additional licenses, is a distribution that varies based on an extent of responsibility or extent of relationship to a real-world event giving rise to the additional licenses.

In block 617 the process distributes the additional licenses, or credit for the additional licenses, amongst the game players. In some embodiments the additional licenses are distributed to the additional game players for each to further distribute as they may see fit. In some embodiments the additional licenses may be provided to additional game players identified by the game players. In some embodiments credits, for example in the form of remuneration, are distributed amongst the game players, with the credits based on an aspect of the additional licenses, for example a sale price of the additional licenses. In some embodiments the credits are in-game credits. In some embodiments the credits are financial payments paid to the game players.

The process thereafter returns.

Figure 7:
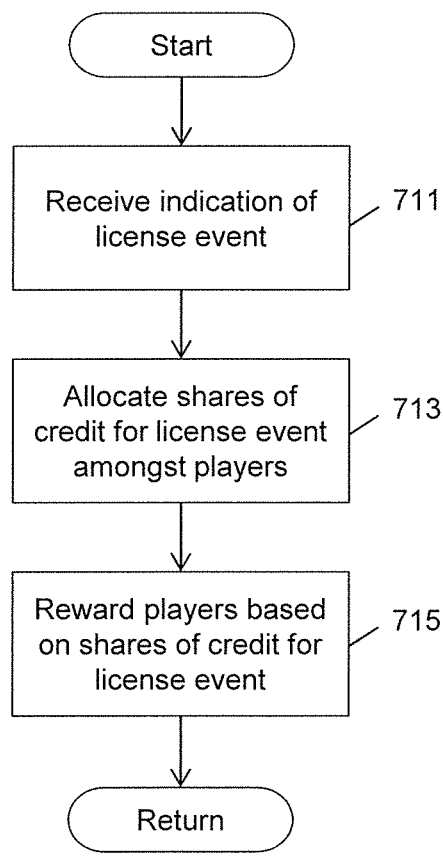
FIG. 7 is a flowchart of a process for rewarding game players for in-game activities or results modifying number of available licenses.

FIG. 7 is a flowchart of a process for rewarding game players for in-game activities or results modifying number of available licenses, or real-world events modifying number of licenses. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by a license server.

In block 711 the process receives an indication of a license event that occurred during and as part of play of a video game, or, in some embodiments an occurrence of a real-world license event. In some embodiments the indication identifies a type of license event. In some embodiments the indication identifies a particular license event, and indicates game players responsible for or whose actions led, at least in part, to occurrence of the license event, or who have a predefined relationship to the license event.

In block 713 the process allocates credit for the occurrence of the license event amongst game players. In some embodiments the credit is allocated based on particular actions of game characters controlled by the game players. For example, a particular game character, or team of game characters, may have taken particular actions resulting in defeat of a video game boss, and credit may be allocated to game players for those game characters, possibly instead of other game players. Also for example, a particular team of game characters may have been involved in game activities leading to a particular specified outcome, and credit may be allocated to game players for those game characters, possibly instead of other game players. In some embodiments the credit is allocated based on a particular action or actions by a person or group, or relating to a particular group of persons. For example credit may be allocated to those winning a tournament. Also for example credit may be allocated to a streamer who receives a predetermined number of views of a stream of the streamer. Also for example, credit may be allocated to game players in Detroit when the temperature in Detroit drops below 32 degrees Fahrenheit.

In block 715 the process rewards game players based on the allocation of credit for the occurrence of the license event. In some embodiments the reward is an in-game reward. In some embodiments the reward is a financial reward.

The process thereafter returns.

Figure 8:
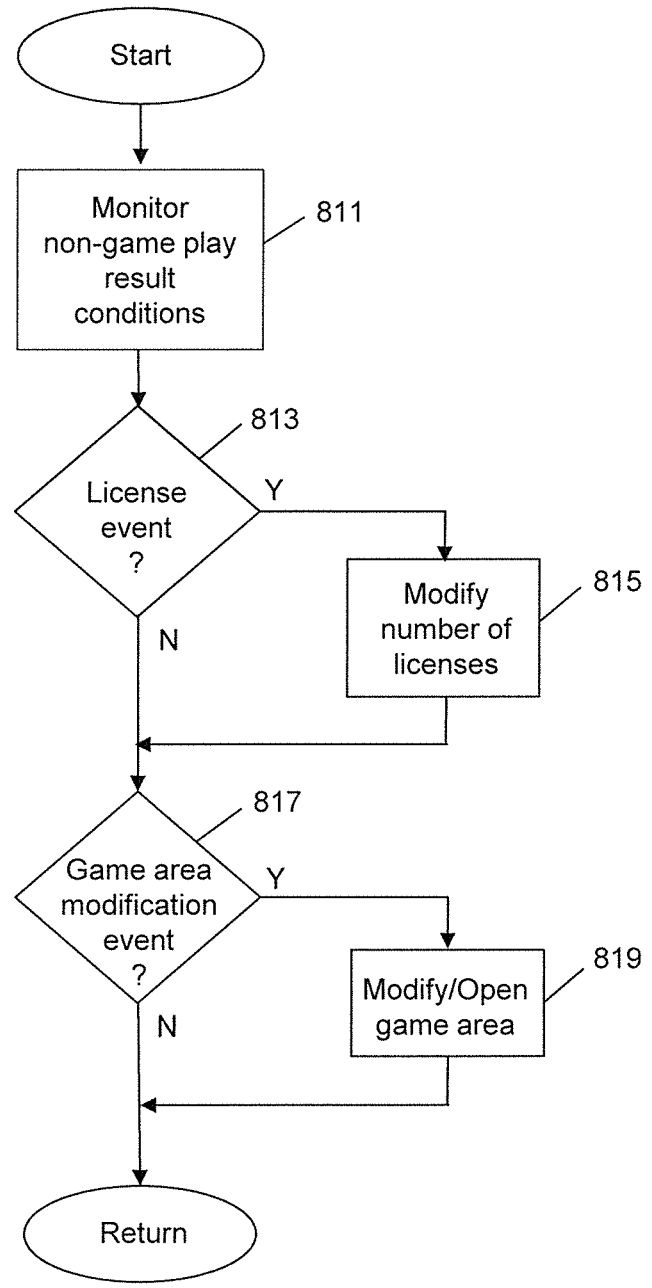
FIG. 8 is a flowchart of a process for modifying a number of licenses for a video game and/or changing the availability of areas in a videogame based on real-world events, in accordance with aspects of the invention.

FIG. 8 is a flowchart of a process for modifying a number of licenses for a video game and/or changing the availability of areas in a videogame based on real-world events, in accordance with aspects of the invention. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by a license server.

In block 811 the process monitors indicators for specified real-world events. In some embodiments the real-world events are conditions of non-game play results or activities of game characters in game play. In some embodiments the specified real-world events are events entirely unrelated to the video game. For example in some embodiments the specified real-world events may relate to a physical condition in the physical world, for example temperature in a specified city, to an outcome of a sporting event in the real-world, for example an outcome of a specified baseball game or set of baseball games (e.g. the winning of a series or title), or a variety of other real-world events. In some embodiments the specified real-world events may instead or in addition be related to the video game. For example, in some embodiments the specified real-world events may include play of the video game for a specified total amount of time by specified persons, whether specified individually or generically, or viewing of a stream of play of the video game by a specified number of viewers, or the outcome of an e-sports event.

In some embodiments the specified real-world event is a streamer getting a certain number of views, in some embodiments the specified real-world event is a predetermined outcome of an esports event. In some embodiments, the specified real-world event is a metric being achieved by an eleague. In some embodiments, the specified real-world event is a particular activity occurring a particular location (e.g. the temperature in City X dropping below freezing,). In some embodiments, the specified real-world event may be that community game play metric is met (e.g. the community plays the game for a predetermined number of hours)

In some embodiments information indicating the specified real-world events which are to be monitored are stored in a database or other data structure. In some embodiments the information includes an indication of an event or condition which is to be monitored, an indication of a source of data indicating the condition, in some embodiments an indication as to whether the source of data is to be interrogated for the information or whether the source of data will supply the data without being interrogated, and in some embodiments an action to be taken on occurrence of the event or condition. In some embodiments the action to be taken is an action to modify a number of licenses available for play of the video game. In some embodiments the action to be taken specifies a criteria to use in modifying the number of licenses. In some embodiment the action to be taken is instead or in addition an action to make an additional area available for play in the video game, or change an aspect of an area already available for play in the video game. In some embodiments aspects of the area are also specified with the action to be taken. In some embodiments information of the database or other data structure may be modified during execution of the process of FIG. 8, allowing for changes to the information indicating the specified real-world events which are to be monitored during execution of the process.

In performing operation of block 811, in some embodiments a server, for example the game server or license server, receives information regarding status of real-world events and/or conditions. In some embodiments the information is received periodically. In some embodiments the information is received periodically in response to requests for information by the server. In some embodiments the information is received upon an occurrence of a specified event.

In block 813 the process determines if a license event has occurred. In some embodiments the process determines if a license event has occurred by comparing information of a real-world event with the information of specified real-world events. In some embodiments the process compares the information only for those events indicated as license events, for example in the action to be taken field or some other field in the information of specified real-world events. In some embodiments the process in addition determines if the information of the real-world event comes from, or derives from in some embodiments, a predetermined source. For example, in some embodiments information as to temperature of a specified locale may be required to come from a specified source, for example the U.S. National Weather Service.

If the process determines a license event has occurred, the process goes to block 815, otherwise the process continues to block 817.

In block 815 the process modifies a number of licenses available for play of the video game in response to the occurrence of the license event. In some embodiments the game server modifies the number of licenses. In some embodiments the license server modifies the number of licenses. In some embodiments the number of licenses is modified by a predetermined amount. In some embodiments the number of licenses is modified based on a number of previous number of licenses available for play of the video game immediately prior to the occurrence of the license event. In some embodiments the number of licenses is modified based on an action to be taken as indicated by the information indicating the specified real-world events. In some embodiments the number of licenses is modified in accordance with an equation of the form y=mx+b, where y equals a number of licenses available after occurrence of the license event, x equals a number of licenses available prior to occurrence of the license event, m is a real number, and b is an integer. In some such embodiments rounding or truncation may be performed such that y is an integer. In some embodiments some other equation may be used to determine y.

In block 817 the process determines if a game area modification event has occurred. In some embodiments the process determines if a game area modification event has occurred by comparing information of a real-world event with the information of specified real-world events. In some embodiments the process compares the information only for those events indicated as game area modification events, for example in the action to be taken field or some other field in the information of specified real-world events. As with the license events, in some embodiments the process in addition determines if the information of the real-world event comes from, or derives from in some embodiments, a predetermined source. For example, in some embodiments information as to temperature of a specified locale may be required to come from a specified source, for example the U.S. National Weather Service.

If the process determines a game area modification event has occurred, the process goes to block 819, otherwise the process returns.

In block 819 the process makes a modification to game areas available for play of the video game. In some embodiments the modification is opening of a new game area. In some embodiments the new game area has a relationship to the real-world event giving rise to the game area modification event. In some embodiments, for example, the new game area may reflect winter conditions if the real world event relates to cold temperatures. Also for example, the new game area may reflect a particular locale, for example a particular city, if the real world event relates to the particular city. In some embodiments the modification is a modification of an existing game area. For example, an existing game area may be modified to reflect winter conditions if the real world event relates to cold temperatures. The process thereafter returns.

Figure 9:
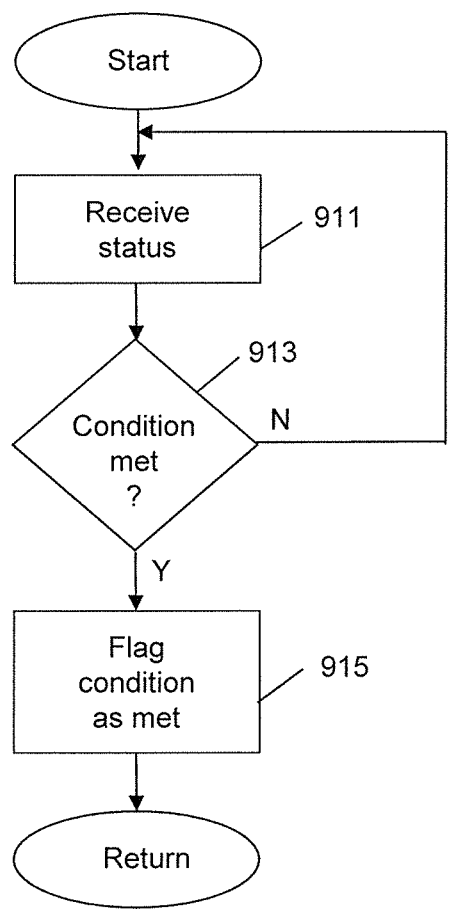
FIG. 9 is a flowchart of a process including monitoring of status of real-world events, in accordance with aspects of the invention.

FIG. 9 is a flowchart of a process including monitoring of status of real-world events, in accordance with aspects of the invention. In some embodiments the process is performed by the system of FIG. 2. In some embodiments the process is performed by one or more processors, for example configured by program instructions. In some embodiments part of the process is performed by a game server, for example the game server of FIG. 2. In some embodiments part of the process is performed by a license server. In some embodiments the process performs operations, or some operations, of some or all of blocks 811, 813, and 817 of the process of FIG. 8.

In block 911 the process receives status information regarding a real-world condition. In some embodiments the receipt of the status information is a result of a request for the status information, for example a request to another server. In some embodiments the request for status information may be made on a periodic basis.

In block 913 the process determines if the status information indicates that the real-world condition has met a specified criteria. For example, the real-world condition may be temperature at a specified location, and the specified criteria may be a particular temperature. Similarly, the real-world condition may be number of views of streams from a particular streamer, and the specified condition may be a particular number.

If the condition is not met, the process returns to operations of block 911. Otherwise the process flags the condition as met, and thereafter returns.

Although the invention has been discussed with respect to various embodiments, it should be recognized that the invention comprises the novel and non-obvious claims supported by this disclosure.

What is claimed is:

1. A method of modifying a number of licenses available for play of a video game, comprising:
   receiving, by at least one server, information, from a plurality of game devices configured for play of a multi-player video game, regarding real-world events based on engagement with the video game;
   monitoring, by the at least one server, the information regarding real-world events for a predetermined real-world event;
   determining, by the at least one server, that a license event has occurred in response to the information regarding real-world events indicating that the predetermined real-world event has occurred; and
   in response to determining that the license event has occurred, increasing, by the at least one server, a number of licenses available for play of the video game, wherein a license for play of the video game is required for play of the video game.

2. The method of claim 1, wherein the at least one server receives the information regarding real-world events and a license server modifies the number of licenses available for play of the video game.

3. The method of claim 1, wherein the number of licenses for play of the video game is modified by a predetermined amount.

4. The method of claim 1, wherein the number of license for play of the video game is modified based on a number of licenses for play of the video game prior to occurrence of the predetermined real-world event.

5. The method of claim 1, wherein the number of licenses for play of the video game is modified based on an action specified to occur upon occurrence of the real-world event.

6. The method of claim 1, wherein the modification of number of licenses for play of the video game is an increase in the number of licenses for play of the video game.

7. The method of claim 6, further comprising distributing the licenses of the increased number of licenses based on information provided by the game players.

8. The method of claim 6, further comprising determining an allocation of credit for occurrence of the preidentified event amongst the game players.

9. The method of claim 1, further comprising making a modification to game areas available for play in the video game based on occurrence of the real-world event.

10. The method of claim 9, wherein the modification comprises opening a new game area.

11. The method of claim 9, wherein the modification has a relationship to the real-world event.

12. A method of modifying game areas of a video game, comprising:
   providing the video game having the game areas available for play, the video game being a multi-player video game playable in a plurality of game devices;
   determining, by at least one server, that a game area modification event has occurred based on a real-world condition meeting a specified condition; and
   making a modification, by the at least one server, to the game areas available for play in response to determining that the game area modification event has occurred.

13. The method of claim 12, wherein the modification to game area available for play comprises opening a new game area for play of the video game.

14. The method of claim 13, wherein the new game area has a relationship to the real-world condition giving rise to the game area modification event.

15. A method of modifying a number of licenses available for play of a video game, comprising:
   receiving, by at least one server, information, from a plurality of game devices configured for play of a multi-player video game, regarding real-world events;
   monitoring, by the at least one server, the information regarding real-world events for a predetermined real-world event;
   determining, by the at least one server, that a license event has occurred in response to the information regarding real-world events indicating that the predetermined real-world event has occurred; and
   in response to determining that the license event has occurred, increasing, by the at least one server, a number of licenses available for play of the video game, wherein a license for play of the video game is required for play of the video game;
   wherein the predetermined real-world event is a natural phenomenon in a specified locale.

16. The method of claim 15, wherein the at least one server receives the information regarding real-world events and a license server modifies the number of licenses available for play of the video game.

17. The method of claim 15, wherein the number of licenses for play of the video game is modified by a predetermined amount.

18. The method of claim 15, wherein the number of license for play of the video game is modified based on a number of licenses for play of the video game prior to occurrence of the predetermined real-world event.

19. The method of claim 15, wherein the modification of number of licenses for play of the video game is an increase in the number of licenses for play of the video game.

* * * * *